June 12, 1945.　　　　R. C. GUNNESS　　　　2,377,935
CATALYTIC HYDROCARBON CONVERSION SYSTEM
Filed April 24, 1941　　　2 Sheets-Sheet 1

Fig. 1.

Inventor:
Robert C. Gunness
Donald E. Payne
By
Attorney

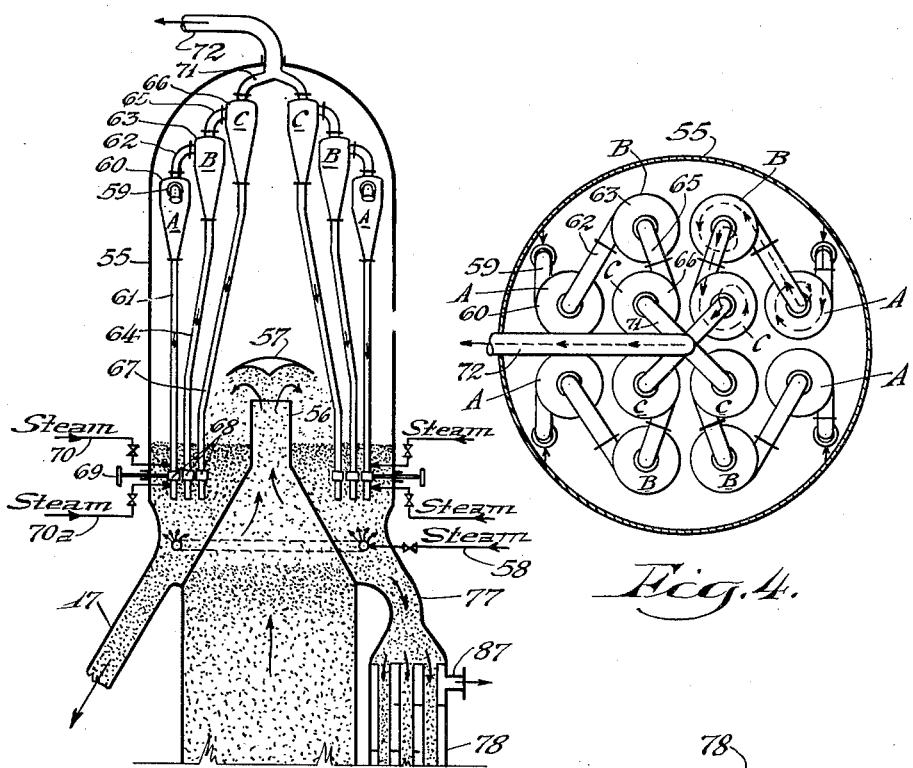
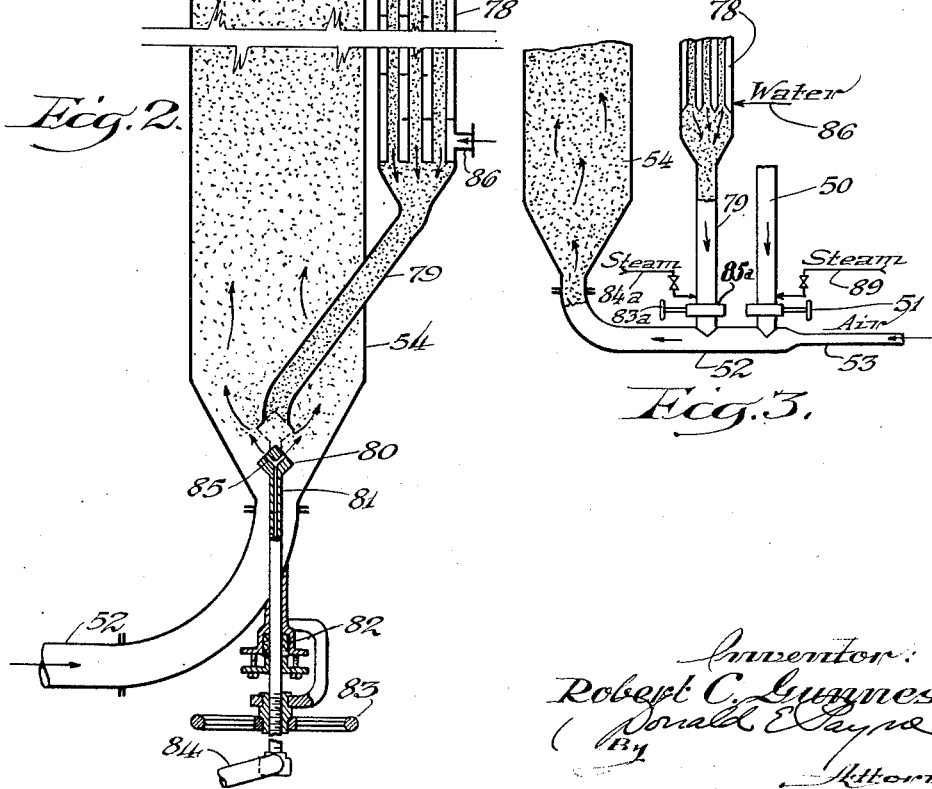

Patented June 12, 1945

2,377,935

UNITED STATES PATENT OFFICE 2,377,935

CATALYTIC HYDROCARBON CONVERSION SYSTEM

Robert C. Gunness, Chicago, Ill., assignor to Standard Oil Company, Chicago, Ill., a corporation of Indiana Application April 24, 1941, Serial No. 390,202

11 Claims. (Cl. 196—52)

This invention relates to a catalytic hydrocarbon conversion system and it pertains more particularly to improvements in a powdered or fluid-type system for separating catalyst from gases and vapors and for obtaining temperature control in a reaction or regeneration system.

In the powdered or fluid-type catalyst system a powdered catalyst effects a conversion while suspended in a hydrocarbon vapor stream. It is then separated from the hydrocarbon vapors and suspended in a gas mixture for regeneration. Regenerated catalyst is then separated from regeneration gases and resuspended in the hydrocarbon vapor stream for effecting further conversion.

A serious problem in the operation of this fluid catalyst system is that of effecting complete separation of catalyst particles from reaction vapors and from regeneration gases respectively. If appreciable amounts of catalyst are lost with regenerator gases, that catalyst will have to be replaced. Even if losses are reduced to one-tenth of one percent of the circulating catalyst the replacement expense is enormous because of the extremely large volume of catalyst that is circulated. An object of my invention is to reduce the catalyst losses for a conversion system to less than .01%. A further object is to reduce the cost of the catalyst recovery system and to simplify the operation thereof. A further object is to eliminate pressure surges with its incident catalyst carry-over in catalyst separation systems.

In order to effect temperature control, particularly in regeneration systems, it has been proposed to cool a portion of the regenerated catalyst and to recycle this cooled regenerated catalyst along with spent catalyst at the base of a regeneration chamber so that enough heat may be absorbed by the relatively cooler regenerated catalyst to keep the temperature from rising above safe limits from the standpoint of catalyst activity, e. g., from exceeding about 1050 or 1100° F. In a 10,000 barrel per day plant employing about 600,000 to 650,000 pounds of regenerated catalyst per hour it may be necessary to recycle about 1,500,000 to 2,000,000 pounds per hour of regenerated catalyst. The heat exchanger for cooling this enormous quantity of recycled catalyst should be designed for substantially vertical catalyst flow and in order to insure the desired flow of catalyst solids through this exchanger it has heretofore been considered necessary to carry the catalyst upwardly through the exchanger in a suspending gas.

If the cooler is mounted along side the regenerator and the suspended catalyst is returned to the upper part of the reactor, the suspending gas by-passes the lower part of the regenerator and places an undue load on the catalyst recovery system without serving to support combustion in the lower part of the regenerator. It has, therefore, been considered necessary to mount the cooler below the level of the regenerator so that the cooled recycled suspension might be introduced at the base of the regenerator. By mounting the cooler below the level of the regenerator the overall height of the equipment may be increased by as much as fifty feet, i. e., from about 150 feet to 200 feet or more. The cost of constructing and operating a structure of such enormous height is one of the most serious problems which has been encountered in the fluid-type catalyst system. An object of my invention is to provide a method and means whereby the regeneration system may be materially decreased in height, thus providing enormous savings in construction and operation costs. A further object is to provide a system wherein recycled catalyst may be cooled at a point above the catalyst inlet to the regenerator. A further object is to simplify and decrease the cost of a system for cooling regenerated catalyst and returning said cooled catalyst to the regenerator. Other objects of the invention will be apparent as the detailed description thereof proceeds.

In practicing my invention I superimpose a catalyst settling chamber over a reaction chamber or a regenerator chamber or both and I make the superimposed settling chamber of sufficient cross-sectional area to permit most of the catalyst to settle out of the gases before they reach the upper part of said superimposed settling chamber. I then provide centrifugal separators inside the settling chamber itself at the upper part thereof. By placing these centrifugal separators inside the enlarged settling zone I effect marked economies in construction costs not only because of the extra piping and supports that would be required for external mounting but because relatively thin walled centrifugal separators can be used; if the centrifugal separators were outside the settling chamber they would have to withstand full operating pressure but when they are mounted inside the settling chamber they need only withstand a pressure of about 1 or 2 pounds per square inch. By mounting the centrifugal separators inside the settling zone the dip legs for returning separated catalyst do not have to pass through a chamber wall but may simply extend vertically into a dense or aerated mass of catalyst in the reaction or regeneration zone or in the enlarged settling zone.

I insure the return of separated catalyst through these dip legs and prevent gas blow-back therethrough by having their lower ends well below the surface of settled or dense phase catalyst. I establish the head of catalyst in each dip leg by means of an externally operated valve (which is open during normal operation) and I provide means above and below this valve for introducing steam so that if any dip leg becomes plugged, its proper function may be restored without shutting down the system. I prefer to employ a series of centrifugal separators in the top of the settling zone so that gases or vapors pass through one or more primary separators, then through one or more secondary separators, then through one or more tertiary separators, etc., before they are finally discharged from the catalyst hopper or settling chamber. I also prefer to employ a geometrical arrangement of such separators in the settling space which will give maximum catalyst recovery in a minimum amount of space.

For effecting temperature control in the regenerator I employ a gravity syphon system which consists simply of a conduit for withdrawing catalyst from an upper dense phase, a tubular heat exchanger, a conduit for returning catalyst directly into the lower part of the regenerator and a means for either controlling the rate of heat transfer to the cooling fluid in the heat exchanger or controlling the rate of flow of powdered catalyst therethrough or both.

The average density of catalyst in the regenerator may be about 15 to 18 pounds per cubic foot. When this catalyst is removed from the upwardly flowing gases or vapors and subjected only to mild aeration its density may be increased by about 1 to 20, for example about 5 or 10, pounds per cubic foot. This denser aerated catalyst still maintains its liquid-like flow characteristics. In practicing my invention I utilize this difference between the density of catalyst in the regenerator and the density of mildly aerated catalyst for effecting a gravity flow of separated catalyst through a vertical heat exchanger and back to the lower part of the regenerator.

The cooled catalyst may be introduced either upwardly or downwardly at the base of the regenerator and the gas which is employed for resuspending this catalyst in the regenerator may serve to support combustion in the lower as well as in the upper part of the regenerator chamber. Thus it will be seen that I have avoided the necessity of employing an up-flow catalyst cooler. I have avoided the enormous expense that would be involved in building the entire regenerator and catalyst separation means above the level of the catalyst cooler. I have provided a temperature control system of remarkable simplicity.

The invention will be more clearly understood from the following detailed description read in conjunction with the accompanying drawings in which Figure 1 is a schematic flow diagram of my improved conversion and regeneration system;

Figure 2 is a vertical section of one form of regenerator and catalyst separation system;

Figure 3 is a partial vertical section of another form or modification thereof and Figure 4 is a top plan view of the cyclone separators showing an example of the compact geometrical arrangement.

While the invention is applicable to a wide variety of hydrocarbon conversion processes such as isomerization, desulfurization, polymerization, reforming, isoforming, alkylation, gas reversion, hydrogenation, dehydrogenation, etc., it is particularly applicable to the catalytic cracking of gas oils and heavier hydrocarbons. The charging stock may consist of or may contain hydrocarbons produced by other conversion processes such as cracking or coking, hydrocarbons synthetically produced by the hydrogenation of carbonaceous materials, or hydrocarbons produced by a carbon monoxide-hydrogen synthesis (the so-called Fischer process). In my preferred embodiment I will describe the invention as applied to a 10,000 barrel per day catalytic cracking plant in which the charge may be Mid-Continent gas oil or may be three parts of virgin gas oil and one part of coke still distillate.

The gas oil feed stock from line 10 is forced by pump 11 into coils 12 of pipe still 13. (Suitable heat exchangers, or preheaters may be employed with liquids or vapors in various parts of the system but the present invention will be more clearly understood and the drawings will be less confused if such heat exchangers and similar engineering details are not specifically described.) The gas oil is vaporized in coils 12 and heated to a transfer line temperature of about 800 to 1050° F., for example about 900° F. to 925° F., at a pressure of about atmospheric to 50 pounds per square inch, for example, about 15 pounds per square inch. Steam from line 14 may be heated with the oil or separately heated in coil 15 and injected into coils 12 or into the transfer line 16, the amount of steam ranging from about 2 to 20%, for example about 10%, by weight based on oil charge.

Hot regenerated catalyst from line 17 is introduced through a slide valve or star feeder 18 into a catalyst suspension zone 19 wherein the catalyst is suspended in grass or vapors from line 16 and is conveyed by said gases or vapors into reaction chamber 20. The weight ratio of regenerated catalyst to oil introduced into the reactor may be about 1:1 to about 8:1 for example about 4:1. The temperature of the catalyst from standpipe 17 may be 900 to about 1100° F., for example about 980 to 1000° F. The suspended catalyst stream is, therefore, introduced at the base of the reactor at a temperature of about 850 to 1050° F., for example at about 950° F. The average vapor velocity in the reactor may range from about 0.3 to 3 feet per second, for example may be about 1.5 feet per second and the pressure at this point may be from atmospheric to 50 pounds, for example about 10 or 12 pounds per square inch.

The catalyst may be of the silica-alumina or silica-magnesia type and may be prepared by the acid treating of natural clays, such as bentonite, or by synthetically preparing a powdered silica-alumina or silica-magnesia mixture. An excellent catalyst may be prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica-alumina catalyst may be rendered more stable at high temperatures by the addition thereto of zirconia in either smaller or larger amounts than alumina. The ball-milled silica-magnesia catalyst may be improved by pretreating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition or preparation of catalyst per se and no further description of the catalyst is, therefore, necessary.

The catalyst in this specific example is in powdered form with a particle size of about 10 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100, 50 or even 10 mesh screen.

The density of the catalyst particles per se may be as high as 160 pounds per cubic foot but the bulk density of catalyst which has settled for 5 or 10 minutes will usually be from 25 to 40 pounds per cubic foot. With slight aeration. i. e., with vapor velocities of about .05 to .5 feet per second, the bulk density 300-400 mesh catalyst will be about 20 to 30 pounds per cubic foot. With vapor velocities of about 1 to 2 feet per second the bulk density of such catalyst may be about 10 to 20 pounds, for example, about 15 pounds to 18 pounds per cubic foot.

In the specific example herein described, the reactor is a cylindrically shaped vessel about 12 or 13 feet in diameter and about 25 feet in height. It should be understood, of course, that the size and shape of the reactor may be varied within fairly wide limits and will be dependent upon the particular catalyst employed, the operating conditions for which it is designed and the results which it is to accomplish. The base of the reactor may be a simple conical member with about a 60° slope. I may, if desired, employ distributing means at the base of the reactor in order to insure uniform catalyst distribution and to prevent a chimneying effect.

The average catalyst residence time in the reactor may range from about 1 to 20 minutes or more and may, for example, be about 8 minutes. The average vapor residence time in the reactor may be about 5 to 50, usually about 10 to 20 seconds. Due to the increase in volume which is produced by the cracking of the heavier hydrocarbons the vapor velocity at the top of the reactor may be slightly greater than at the bottom of the reactor.

At the top of the reactor I provide an enlarged catalyst separating chamber 21 which in this case may be about 16 feet in diameter and about 30 to 50 feet high. Reaction gases and suspended catalyst leave the top of the reactor through vertical pipe 22. Baffle 23 distributes this stream uniformly throughout the cross-sectional area of the separating chamber wherein the upward vapor velocity is sufficiently low to permit settling. About 550,000 to 600,000 pounds per hour of catalyst may settle out of the ascending vapors into the annular space or catalyst "accumulator" between pipe 22 and the walls of chamber 21. An additional amount of catalyst amounting to about 50,000 pounds per hour may be recovered in cyclone separators which will hereinafter be described in more detail.

The remaining unseparated catalyst which may amount to only about .01 to .02% of the total amount charged is carried with reaction vapors through line 24 to the lower part of fractionating column 25 and this residual catalyst material is withdrawn from the base of the fractionating column with a small amount of heavy cycle oil and either withdrawn from the system through line 26 or recycled through line 27. A heavy gas oil side stream may be withdrawn through line 28 and a light gas oil side stream through line 29.

Gases (including steam) and gasoline may be taken overhead through line 30, through cooler 31 to receiver 32, which is designed for the separate removal of condensed water, condensed oil and uncondensed gases. The water separates as a lower layer and is withdrawn through line 33. The gases are compressed by compressor 34 to a pressure of about 135 pounds per square inch and the liquids are pumped by pump 35 to a corresponding pressure after which the mixture of hydrocarbons is introduced by line 36 into a pressure fractionation system 37 which is diagrammatically represented as a single column with a heating means 38 at its base and a reflux means 39 at its top. A $C_2$ hydrocarbon and lighter gas fraction may be removed through line 40, a $C_3$—$C_4$ fraction through line 41, a light naphtha fraction through line 42 and a heavy naphtha fraction or 400° F. end point gasoline through line 43. It should be understood that this recovery system is shown diagrammatically and that suitable stills, absorbers, stabilizers, etc., will be used in actual practice to effect this fractionation.

The settled catalyst in the hopper of settling chamber 21 is maintained in fluent form by aeration with steam introduced through line 44 to distributing means at the base of the settling chamber. This steam not only accomplishes the aeration of the catalyst but it strips hydrocarbon vapors therefrom. About 1750 to 2000 pounds per hour of steam may be employed for this purpose.

For the purpose of maintaining the desired quantity of catalyst in the reactor with relatively low incoming catalyst-to-oil ratios it may be desirable to reintroduce catalyst from the top of the reactor to the base thereof. This may be accomplished by providing a straight pipe 45 which communicates its upper end with settled catalyst and which has its lower end within reactor 20. In order to regulate the amount of catalyst thus returned to the reactor I may provide a hollow pipe closure 46 which is connected by a hollow valve stem 47 to external control means 48. Steam from line 49 may be introduced through the hollow stem and the pipe closure for maintaining proper aeration of catalyst in pipe 45.

Spent catalyst is withdrawn from the hopper portion of settling chamber 21 through standpipe 50 and is introduced in amounts controlled by valve or star feeder 51 into suspension zone 52 wherein it is suspended in air from line 53. The suspended catalyst is then introduced into the base of regenerator 54 which may be a hollow cylindrical vessel similar to reactor 20 but of larger size, the diameter of the regenerator being for example about 18 feet and its height being about 50 feet. The 633,000 pounds per hour of catalyst which is thus introduced into the regenerator may have deposited thereon about 10,000 or 12,000 pounds of carbonaceous material and for the regeneration of this catalyst it may be necessary to introduce about 70,000 to 75,000 pounds per hour of air. The catalyst in standpipe 50 may be at a temperature of about 900° F. The pressure at the base of the regenerator may be about 16 pounds per square inch. The average vertical gas velocity in the regenerator may be about 1.5 feet per second. The temperature throughout the regenerator may be about 1000° F.

At the top of the regenerator I provide a catalyst separating chamber 55 which may be about 22 feet in diameter and about 30 to 50 feet high and which contains centrifugal separating means which will be hereinafter described. The regeneration gases together with suspended catalyst are introduced from the regenerator into the settling chamber by pipe 56 and the gases are deflected by baffle 57 to insure uniform distribution. Regenerated catalyst settles out of the ascending vapors into the hopper between pipe 56 and the walls of chamber 55, this settled catalyst being stripped and aerated by steam or other inert gas introduced through line 58 (and multiplicity of ports not shown).

To effect substantially complete recovery of catalyst from regeneration gases I employ a system of internal centrifuges shown in more detail in Figures 2 and 4. In this particular example I employ four systems of primary, secondary and tertiary cyclone separators which are compactly nested together inside the top of the catalyst settling chamber 55. The arrangement of these cyclones is shown in Figure 4 wherein the primary cyclones are designated A, secondary cyclones as B and the tertiary cyclones as C.

In Figure 2 I have diagrammatically shown the arrangement of cyclones with 6 in a single plane but it should be understood that I contemplate the use of a nested arrangement as shown in Figure 4 in order that I may obtain maximum utilization of the space in the separator shell. It will be noted that the four primary separators are opposed to each other and have their inlets spaced from each other by about 90 degrees. The secondary cyclones are likewise opposed to each other and are immediately adjacent the primary cyclones, thus utilizing the outer available space in the separating chamber and providing for short connections. The tertiary cyclones fill the available inner spaces and again make possible the use of short connections. Other geometrical arrangements may be employed but it is desirable that the primary inlets be uniformly arranged throughout the cross-sectional area of the separator.

Most of the catalyst separates from the ascending gases in separator 55 so that in the inlet to the primary separators the gases may contain about 400 grains of catalyst per cubic foot. About 185 cubic feet per second of such gas is picked up by each of the primary cyclone inlets 59 and tangentially introduced into primary cyclones 60. Upwards of 30,000 pounds per hour of catalyst may be separated in each of these primary cyclones and returned to a point underneath the level of settled catalyst in the hopper space by dip legs 61. With a pressure of about 8 pounds per square inch in the settling chamber, the pressure in cyclones 60 will be about 7½ pounds so that the settled catalyst layer in dip legs 61 will be at a sufficiently higher level than settled catalyst in the hopper to compensate for this pressure differential.

The gases leaving the primary cyclones 60 are passed through lines 62 and tangentially introduced into secondary cyclones 63 which operate at a pressure of about 7 pounds per square inch. Here the introduced gases may contain about 75 grains of catalyst per cubic foot and each secondary cyclone may recover upwards of 4,000 pounds per hour of catalyst which is returned to a point beneath the level of settled catalyst in the hopper by means of dip legs 64. The level of settled catalyst in dip legs 64 will be even higher than the level in dip legs 61 because of the lower pressure in cyclones 63.

Gases from cyclones 63 are then introduced by lines 65 into tertiary cyclone separators 66 which operates at about 6½ pounds per square inch pressure. Here the entering gases may contain about 35 grains of catalyst per cubic foot and from each of these separators upwards of 1,200 pounds of catalyst may be returned to a point below the surface of the settled catalyst layer in the hopper through dip legs 67. The catalyst level in dip legs 67 will be still higher than the level in dip legs 64, the head of catalyst in each of the dip legs compensating for the difference between the pressures in the respective cyclone separators and the pressure within the settling chamber.

It is very important to have each of the dip legs extend well below the level of dense phase or settled catalyst in order that the settled catalyst may form a seal for said dip legs even when the catalyst level is relatively low. Should this seal be broken the vapors might enter the respective cyclones through the dip legs instead of through the tangential inlets and thus nullify any beneficial effects of the cyclone separators.

In order to insure the proper functioning of the dip legs I provide each of them with a valve which is preferably at a point near their respective bases. The valve stems may extend through the walls of chamber 55 for external control by a handle 69, or other suitable operating means. Aeration steam may be introduced into the dip legs immediately above and below valves 68 through lines 70 and 70a respectively, separate lines leading to each dip leg. At the beginning of operation, valves 68 may be closed and a small amount of aeration steam may be introduced through lines 70 so that the dip legs may be substantially filled with settled catalyst in aerated fluent form. Then, when the lower ends of the dip legs are properly sealed by settled catalyst in chamber 55, valve 68 may be opened and the settled catalyst will immediately flow downwardly in the dip legs until the pressure in chamber 55 is balanced by the head of catalyst in the dip legs. Thenceforth the catalyst head in the dip legs is automatically maintained, usually without the necessity of any aeration steam. The head of catalyst in dip legs 64 will be higher than in dip legs 61 and the head in dip legs 67 higher than that in dip legs 64.

If at any time a dip leg should become plugged or should lose its necessary catalyst head, that fact will be evidenced by an undue amount of catalyst leaving the separation system through lines 71. In this event the valve or valves 68 may be closed and the corresponding dip leg may be blown free of catalyst by the introduction of steam through lines 70 and 70a. When the dip leg has thus been freed its operation may be resumed in the manner above described.

Gases may leave tertiary cyclones 66 through lines 71 and then introduced by line 72 to a heat exchanger 73 or other suitable device for recovering the energy from the regeneration gases. The cooled gases may leave the heat exchanger at about atmospheric pressure and then be passed through a Cottrell precipitator 74 for the removal of any fines that may still be retained therein. The gases which leave the Cottrell precipitator through line 75 may be practically denuded of catalyst. The fines recovered from line 76 may be mixed with coarser catalyst and returned to the system or may be reworked or reconverted by physical or chemical means into catalyst of more desirable particle size.

As hereinabove pointed out, the nesting of the cyclone separators inside the enlarged catalyst settling chamber is one of the important features of my invention. I accomplish marked savings in the cost of materials and the cost of construction. I avoid heat losses that are practically inevitable with the external cyclone mountings heretofore employed. Still more important, however, is the marked savings in catalyst handling cost and equipment. External cyclones require hoppers, conveying systems, etc., for handling the separated catalyst and returning it to the catalyst hopper and all of this extraneous storage and handling equipment is avoided by the use of my invention. The dip legs may be substantially straight pipes and may be substantially vertical so that they offer no flow problems. The pressure differentials are automatically controlled by the head of settled catalyst material in the respective dip legs. By avoiding the external handling of catalyst I minimize catalyst attrition and thus effect marked savings in catalyst material as well as a savings in the cost of equipment.

Another important feature of my invention is the admixing of the catalyst fines which are separated in the cyclone separators with the coarser catalyst material which settles out in the enlarged settling zone. It is important in fluid-type catalyst systems that the catalyst be fairly uniform and it is undesirable to have catalyst fines segregated from coarser catalyst material. In the system hereinabove described, the catalyst fines are automatically admixed with the coarser catalyst particles and this admixture is further augmented by the slight turbulence produced by the introduction of stripping steam through line 58.

In order to prevent the development of excessively high temperatures in the regenerator it is necessary to abstract heat therefrom. Thus about 1,500,000 to 2,000,000 pounds per hour of regenerated catalyst may be withdrawn from the hopper in settling chamber 55 and passed through conduit 77 through external heat exchanger 78 and then be introduced by conduit 79 directly into the lower part of the regenerator. The amount of recycled catalyst may be controlled by a cone-shaped valve closure 80 mounted on hollow stem 81 which extends through a suitable packing gland 82 and is raised or lowered by external means 83. Steam may be introduced into the hollow stem through line 84 so that when the lower end of pipe 79 is completely closed the catalyst in this pipe and in the exchanger and pipe 77 can be maintained in aerated condition. When the cone-shaped valve is in the open position as shown in Figure 2, the steam from the laterally extending ducts 85 will disperse the recycled catalyst into the regenerator and prevent it from falling as a slug into the base of the regenerator chamber.

Cooling fluid may be introduced through line 86 and withdrawn therefrom through line 87. The catalyst flows through the tubes of heat exchanger 78, the ends of which may be designed for streamlined flow and for preventing dead spots for catalyst accumulation. The temperature control may be effected either by regulating the amount and temperature of cooling fluid introduced through line 86 or by regulating the amount of regenerated catalyst which is recycled or both. When regenerating about 633,000 pounds per hour of spent catalyst, I may recycle about 1,500,000 to 2,000,000 pounds per hour of recycled catalyst and cool this catalyst to a temperature of about 840 to 850° F. The heat abstracted from recycled catalyst in exchanger 78 may be utilized for generating steam or for any other purpose.

The catalyst recycling system hereinabove described functions by virtue of the difference in catalyst density in the reactor, which density may be about 15 or 20 pounds per cubic foot, and the density of aerated catalyst in pipe 77, exchanger 78 and pipe 79, which density may be about 25 or 30 pounds per cubic foot. This difference in density provides the necessary head for maintaining a gravity syphon effect so that the recycling of catalyst is accomplished without the use of the upflow catalyst coolers heretofore considered essential for successful operation.

While nested internal cyclones have been described in detail in connection with the regenerator, it should be understood that they may likewise be employed in the separating chamber which is superimposed over the reactor. In the appended claims the term "reactor" is intended and hereby defined to mean either chamber 20 or chamber 54.

Regenerated catalyst from the hopper in separator 55 is returned to the reactor through standpipe 17 as above described. Standpipe 17 may be a conduit about 25 or 26 inches in diameter and about 65 to 70 feet high. Standpipe 50 may be of about the same diameter but about 10 or 15 feet higher because of the greater height of the regenerator. Both of these standpipes are aerated by steam, which may be introduced through line 88 at the base of standpipe 17 and through line 89 at the base of standpipe 50.

It is not essential that return pipe 79 extend downwardly inside the regenerator and a highly desirable alternative arrangement is illustrated in Figure 3. Here the spent catalyst from standpipe 50 is picked up by air from line 53 as illustrated in Figure 1. In this case, however, standpipe 79 leads directly to suspending zone 52 and the recycled catalyst is likewise picked up by this air and introduced into the base of regenerator 54 together with suspended spent catalyst. In this case the flow of recycled regenerated catalyst is regulated by valve 85a which is manipulated by external means 83a and aeration steam is introduced through line 84a.

The head of aerated catalyst in standpipes 50 and 79 is sufficient to maintain a pressure at valves 85a and 51 respectively which is greater than the pressure in dispersing zone 52 so that there will be no tendency for the introduced air to blow back through the standpipes.

It should be understood, of course, that the relative positions of standpipes 79 and 50 may be reversed, i. e., the incoming air may first pick up the recycled catalyst and then pick up the spent catalyst. In any event the recycled catalyst cooler is above the level of the inlet to regenerator 54 which markedly reduces the necessary height of the regeneration system and effects substantial savings in cost.

While I have described in detail a specific example of my invention it should be understood that I do not limit myself to the specific arrangement or to any of the specific details hereinabove set forth since many modifications and equivalents of the preferred embodiment will be apparent from the above description to those skilled in the art.

I claim:

1. In a fluid type contacting system an upflow contacting chamber having inclined top walls terminating in a discharge conduit of smaller cross-sectional area than that of the contacting chamber, a settling chamber of larger diameter than the contacting chamber and mounted above said contacting chamber, the top wall of the contacting chamber forming the inner part of the bottom wall of the settling chamber and the space between said discharge conduit and the outer walls of the settling chamber forming a separated solids accumulator, means for introducing a gas or vapor stream at a low point in the contacting chamber and for introducing powdered solids thereto whereby said solids pass upwardly through said contacting chamber and are carried by the upflowing gases or vapors through the discharge conduit into the settling chamber, a cyclone separator inside the settling chamber, an inlet for said separator in the upper part of said settling chamber, a dip leg extending from said separator into the separated solids accumulator between the upflow conduit and the settling chamber walls, said dip leg being of sufficient length to provide a separated solids head sufficient to balance the difference between the pressure in the settling chamber and the pressure in the cyclone separator, means for introducing a gas at a low point in the accumulator for maintaining separated solids in aerated condition, means for withdrawing settled solids downwardly from a low point in the accumulator and means for withdrawing gases substantially denuded of solids from the cyclone separator to a point outside of said chamber.

2. The apparatus of claim 1 which includes a heat exchanger, means for introducing settled aerated solids from a low point in said accumulator to an upper point in the heat exchanger and means for returning aerated settled solids from a low point in said heat exchanger to said contacting zone whereby dense phase solids may pass downwardly from the accumulator through the heat exchanger by gravity and thence be returned to the contacting chamber.

3. In a system as defined in claim 1, a second contacting chamber, means for introducing catalyst from said accumulator to said second contacting chamber, means for introducing a gas or vapor at a low point in the second contacting chamber, means for separating solids from gases or vapors leaving the second contacting chamber and means for returning said separated solids to said first contacting chamber.

4. An apparatus which comprises two systems as defined by claim 1 and means for introducing catalyst from the accumulator of each system to the contacting chamber of the other system.

5. The system of claim 1 which includes a plurality of cyclone separators mounted inside of said settling chamber, dip legs extending from each separator to the accumulator between the upflow discharge conduit and the settling chamber walls and means extending through the chamber walls for externally controlling the operation of said cyclone separators.

6. In a fluid type catalyst system wherein a powdered catalyst effects a conversion while suspended in hydrocarbon vapors, is then separated from the hydrocarbon vapors and suspended in a gas mixture for regeneration and is then separated from the regeneration gas and returned for further conversion, the improved method of obtaining temperature control in a regeneration zone which comprises separating dense phase catalyst from upflowing regeneration gases at a high level in a regeneration system, maintaining the separated catalyst in fluent condition by the introduction of an aeration gas thereto, passing said aerated catalyst in dense phase condition downwardly by gravity in contact with substantially vertical cooling surfaces, and introducing the cooled catalyst into the regeneration zone for absorbing heat.

7. In apparatus for the regeneration of catalyst, an elongated upflow regenerator, means for feeding spent powdered catalyst to said regenerator, a regenerated catalyst accumulator, means for introducing an oxygen containing gas at a low point in the regenerator for suspending catalyst in said regenerator and transferring catalyst to said accumulator, a heat exchanger below the level of the accumulator and comprising a plurality of substantially vertical tubes surrounded by a shell, means for introducing a cooling fluid into said shell and for removing fluid from said shell and means consisting essentially of a substantially vertical conduit for passing regenerated catalyst by gravity from said accumulator and through the tubes of said heat exchanger and thence back to said regenerator.

8. In a fluid-type catalyst system wherein powdered catalyst effects conversion while suspended in hydrocarbon vapors, is then separated from the hydrocarbon vapors and suspended in a gas for regeneration and is finally separated from regeneration gas and returned for further conversion the improved apparatus which comprises a catalyst regeneration tower, a settling chamber of larger cross-sectional area than the regeneration tower, means for introducing catalyst from the regeneration tower to the settling chamber, a tubular heat exchanger, a conduit extending downwardly from a low point point in said settling chamber to the top of said heat exchanger, a conduit extending from the base of said heat exchanger to a low point in said tower, means for maintaining powdered solids in aerated fluent condition in its downward flow through the heat exchanger, a jacket surrounding the tubes in said heat exchanger and means for introducing a fluid cooling medium at the base of said jacket and for withdrawing fluid from an upper point of said jacket.

9. The system of claim 8 which includes means for controlling the amount of catalyst which flows through said heat exchanger.

10. The system of claim 8 which includes a cyclone separator mounted within said settling chamber.

11. The method of claim 6 wherein the introducing of cooled catalyst into the regeneration zone is effected by passing a downwardly moving column of aerated cooled catalyst by gravity directly into said regeneration zone.

ROBERT C. GUNNESS.